(12) United States Patent
Trivedi et al.

(10) Patent No.: US 11,346,093 B2
(45) Date of Patent: May 31, 2022

(54) INTERCHANGEABLE SYSTEM FOR OVERFLOW TREATMENT AND TERTIARY FILTRATION FOR WASTEWATER TREATMENT FACILITIES

(71) Applicants: Ovivo Inc., Montreal (CA); Hiren Trivedi, Cedar Park, TX (US); Michael Snodgrass, Santa Barbara, CA (US)

(72) Inventors: Hiren Trivedi, Cedar Park, TX (US); Michael Snodgrass, Santa Barbara, CA (US)

(73) Assignee: Ovivo Inc., Montreal (CA)

( * ) Notice: Subject to any disclaimer, the term of this patent is extended or adjusted under 35 U.S.C. 154(b) by 95 days.

(21) Appl. No.: 16/765,817

(22) PCT Filed: Nov. 21, 2018

(86) PCT No.: PCT/US2018/062335
§ 371 (c)(1),
(2) Date: May 20, 2020

(87) PCT Pub. No.: WO2019/104234
PCT Pub. Date: May 31, 2019

(65) Prior Publication Data
US 2020/0284018 A1    Sep. 10, 2020

Related U.S. Application Data

(60) Provisional application No. 62/590,197, filed on Nov. 22, 2017.

(51) Int. Cl.
*E03F 3/02* (2006.01)
*C02F 1/00* (2006.01)
(Continued)

(52) U.S. Cl.
CPC ............... *E03F 3/02* (2013.01); *C02F 1/004* (2013.01); *C02F 1/006* (2013.01); *C02F 1/444* (2013.01);
(Continued)

(58) Field of Classification Search
CPC .. E03F 3/02; C02F 1/004; C02F 1/006; C02F 1/444; C02F 2103/001; C02F 2301/043
See application file for complete search history.

(56) References Cited

U.S. PATENT DOCUMENTS 7,147,777 B1    12/2006 Porteous
7,169,306 B1    1/2007 Porteous et al.
(Continued)

FOREIGN PATENT DOCUMENTS

GB    2396348 A    6/2004

*Primary Examiner* — Liam Royce
(74) *Attorney, Agent, or Firm* — Thomas M. Freiburger

(57) ABSTRACT

Combined Sewer Overflow (CSO) events require certain minimum treatment, before discharge, according to EPA regulations. However, these events are infrequent, and CSO treatment systems remain idle most of the time. Tertiary filtration is typically used to polish off the secondary treated water in order to remove suspended matter, phosphorous, etc. Tertiary systems are usually designed to handle design flows and remain active most of the time. These are two independent unit operations requiring major capital investment and operational expense. According to this invention an interchangeable system is able to switch a tertiary treatment reactor back and forth between two applications ensuring seamless operation, smooth transition and significant cost savings for treatment facilities.

4 Claims, 1 Drawing Sheet

(51) Int. Cl.
*C02F 1/44* (2006.01)
*C02F 103/00* (2006.01)

(52) U.S. Cl.
CPC .. *C02F 2103/001* (2013.01); *C02F 2301/043* (2013.01)

(56) References Cited

U.S. PATENT DOCUMENTS

| | | |
|---|---|---|
| 8,999,170 B2 | 4/2015 | Livingston |
| 9,359,746 B1 | 6/2016 | Amend et al. |
| 2003/0136686 A1 | 7/2003 | Herbst |
| 2003/0173300 A1* | 9/2003 | Bradley ................ B01D 17/06 210/665 |
| 2005/0011820 A1* | 1/2005 | Webb ...................... C02F 1/008 210/192 |
| 2006/0108270 A1* | 5/2006 | Kosanda .................. C02F 1/76 210/198.1 |
| 2006/0159519 A1 | 7/2006 | Schluter et al. |
| 2008/0073267 A1 | 3/2008 | Cort |

* cited by examiner

INTERCHANGEABLE SYSTEM FOR OVERFLOW TREATMENT AND TERTIARY FILTRATION FOR WASTEWATER TREATMENT FACILITIES

This application claims benefit of U.S. provisional application No. 62/590,197, filed Nov. 22, 2017, and is a national filing of PCT/US2018/062335.

BACKGROUND OF THE INVENTION

This invention concerns wastewater treatment and particularly the handling of overflow beyond system capacity sewerage as of a treatment plant, due to storm flow or other causes.

Combined sewer overflows (CSO) and sanitary sewer overflows (SSO) occur when wastewater flow exceeds capacity, i.e. design flow, of a receiving wastewater treatment facility, or of sewerage. Design flow is defined as a plant's highest capacity to provide complete treatment. A CSO or SSO in a wastewater system results in an overflow of untreated sewage directly or indirectly to the nearest water body. A plant can also be down for a time due to repair or maintenance needs, causing a need to treat sewage alternatively.

The primary cause of overflows is infiltration of groundwater into sewer lines or direct inflow of storm water into a separated or combined sewage system. If provided, a treatment system for CSO and SSO may sit idle for long periods of time and then need to be operational with little to no advance notice, with reduced initial effectiveness. Current systems used for CSO and SSO treatment may also require some "Start Up" time that can lead to untreated or partially untreated discharges until the system can become fully operational.

When provided, many CSO/SSO facilities have at least some form of screening to capture large solids, for example those in excess of ½". Various forms of chemical/physical processes such as rapid sand filtration or ballasted floc systems have been used to capture small particles. Chlorination followed by dechlorination is commonly used for disinfection.

Such existing CSO systems, as noted above, require advance startup time to operate at peak design capacity and become fully operational. Also, adequate time is needed for disinfection, and to remove excess disinfectant. Further, CSO treatment requires a relatively large area. Finally, considerable capital cost, as well as operational expense, are involved in providing such a CSO treatment system.

See also Ovivo U.S. Pat. No. 8,999,170, describing a storm/peak overflow treatment system with several physical and chemical treatment steps.

Combined Sewer Overflow (CSO) treatment has received much attention with recent events. A list of current consent decrees of the U.S. Environmental Protection Agency (May 2017) is estimated to cost utilities at least $30 billion in compliance. CSO treatment is usually designed to handle above design flows and is typically designed to provide only basic treatment in terms of removal of suspended matter and disinfection before discharge. These storm events are infrequent. Hence, most of the time the CSO treatment systems remain idle. To start them up when needed, and to mothball them when not in operation, is always a challenge for utilities. Further, the first influx of storm water always is most difficult to treat. Typically media (including but not limited to cloth, sand, anthracite, activated carbon etc.) and/or membrane (including but not limited to polymeric, ceramic, silicon carbide etc.) based systems are used for CSO treatment. Disinfection before final discharge or reuse may or may not be required.

SUMMARY OF THE INVENTION

The current invention encompasses an interchangeable system wherein one of the processes used in a normal sequence of wastewater treatment steps is switched to a different role during storm flows, to provide a treatment for the CSO or SSO ("overflow").

Tertiary filtration systems are designed to run essentially continuously and usually require removing suspended matter and reduction or removal of phosphorous and sometimes nitrogen, among other things, after the secondary treatment. Typically filter media (including but not limited to cloth, sand, anthracite, activated carbon etc.) and/or membrane (including but not limited to polymeric, ceramic, silicon carbide etc.) based systems are used for tertiary treatment. Disinfection before final discharge or reuse may or may not be required.

As explained above, starting up CSO treatment to provide an effective overflow treatment at a moment's notice is a major challenge. Membrane based systems may mitigate the challenge to a certain extent but in any case require significant capital and operational expense.

The invention involves using an interchangeable system with an interchangeable treatment zone which normally operates as tertiary filtration system, but becomes the CSO and/or SSO (overflow) treatment system as and when required. Proper sizing coupled with adequate piping/instrumentation and plant control will ensure smooth transitioning between two functionalities at the start and end of any CSO/SSO event, to allow seamless operation.

The invention provides several benefits. It saves significant capital and operational expenses for utilities by combining two requirements. Further, the invention eliminates typical concerns during startup of CSO systems. Additional benefits occur for utilities that require CSO treatment but not necessarily tertiary treatment. Since the CSO system can also be used as the tertiary treatment system, the facility will be able in normal operation to discharge/reuse higher quality treated water than before. Still further, a pure stormwater excess flow event, in a separate stormwater system, can be handled by the interchangeable treatment zone in the event piping to the plant is in place. An additional advantage of the invention is that during down time of a plant or one of its treatment units the interchangeable treatment zone can be used to minimally treat sewage. Some polishing may be required in this event, such as carbon or zeolite.

DESCRIPTION OF PREFERRED EMBODIMENTS

Figure 1:
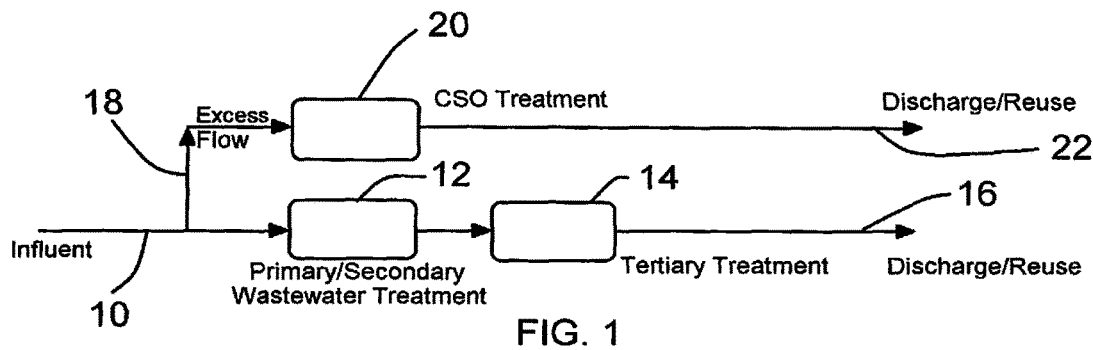
FIG. 1 is a schematic flow diagram indicating a typical prior art plant with CSO treatment.

FIG. 1 is a simple schematic diagram showing treatment of CSO (combined sewer overflow) excess flow during a storm event, in accordance with prior art. As used in reference to FIG. 1, the term "CSO" is intended also to include sanitary sewer overflows, in which storm water infiltrates a sanitary sewer system to create the overflow. In either event the overflow occurrences are infrequent and it is not economical to design a sewage treatment plant for expected peak overflow conditions. For these reasons CSO events require not full primary/secondary treatment but certain minimal treatment before discharge, according to EPA regulations.

In FIG. 1 an overflow event is indicated in the influent to the plant at 10. Wastewater equivalent to a plant design flow is directed through normal channels, including primary and secondary wastewater treatment indicated at 12. The treatment plant may or may not include tertiary treatment, indicated at 14. Discharge of the treated design flow effluent liquid is indicated at 16. The excess flow in a CSO event is represented at 18 in FIG. 1. That flow is treated in a CSO treatment unit 20, and is discharged (or reused) as noted at 22. The CSO treatment unit 20 typically provides only minimal treatment, with one or several of the systems described above, usually including screening. A coagulant may be added in the CSO treatment to aid in precipitation. If membranes are used, the CSO treatment can be fairly thorough, and if membrane pore size is small enough, the effluent can be sufficiently clean that the final disinfection step is not required.

A CSO treatment unit such as shown at 20 remains idle for most of the time.

The tertiary treatment system or unit 14, in a typical plant that includes tertiary treatment, can be any final cleaning or polishing step that follows secondary treatment. Sometimes denitrification filters are included, i.e. media-based filters with added organic carbon. These involve a biological reaction, by which bacteria in the water use carbon to reduce nitrate. Otherwise, media filters or cloth filters might be used. Sometimes tertiary treatment is designed to remove phosphorus as a precipitant. These units include addition of a coagulant, such as alum. Ferric chloride or various polymers can also be used as a phosphate precipitating agent. Tertiary treatment can be used to remove dissolved matter, either organic or inorganic, or both.

In many cases tertiary treatment systems are designed to handle design flows, and they remain active all of the time.

Some tertiary treatment systems include membranes. Membranes can remove remaining bacteria and separate out any other remaining impurities.

Figure 2A:
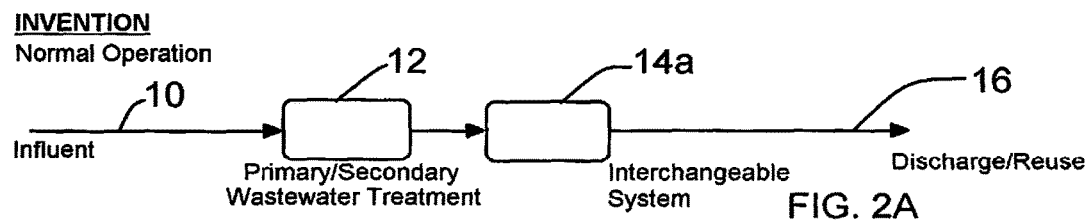
FIGS. 2A and 2B are schematic flow diagrams showing wastewater treatment flow in a process and plant according to the invention, and indicating normal operation and CSO operation.
Figure 2B:
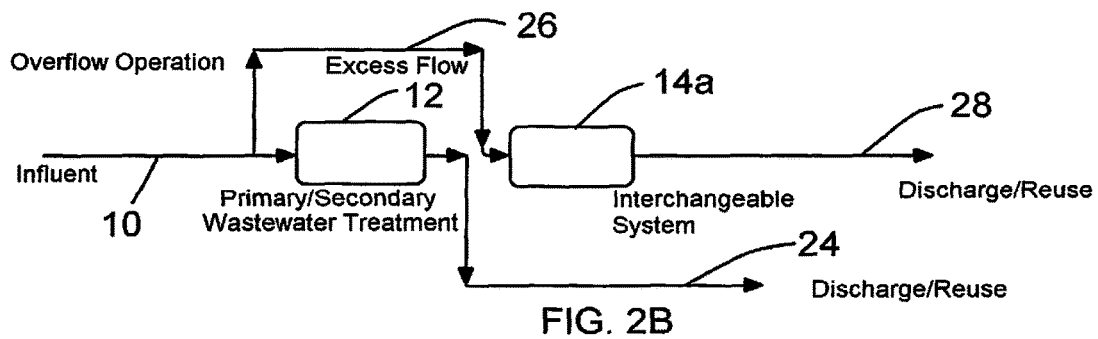
Figure 2C:
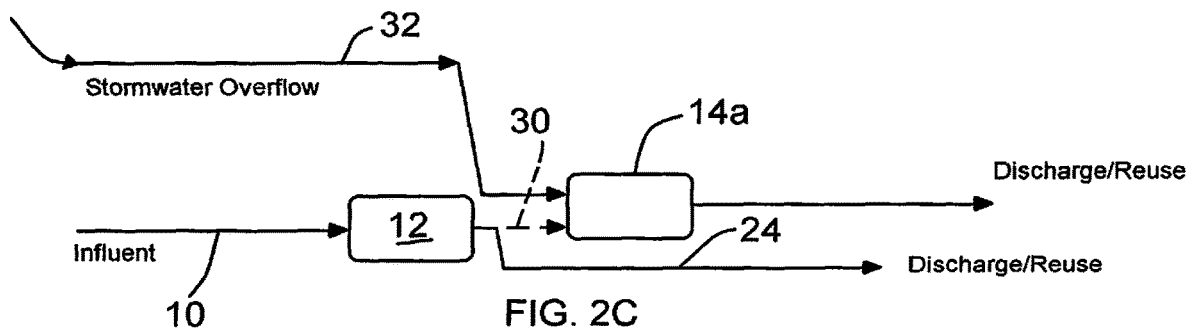
FIG. 2C is a similar schematic flow diagram showing a similar overflow system in which a pure stormwater overflow event is treated, showing the system during the overflow event.

The invention, as outlined in FIGS. 2A to 2C, re-purposes a tertiary treatment unit as an interchangeable system 14a and takes advantage of any redundancies. FIG. 2A outlines the normal operation of a plant, wherein influent wastewater 10, at design flow or below, is treated in primary and secondary treatment steps 12. The wastewater is then further refined or polished in an interchangeable system 14a, which in this normal mode acts as a tertiary treatment according to the descriptions of such systems above. The tertially treated water is discharged at 16.

In overflow operation, shown in FIG. 2B, the influent wastewater 10 flows in a design flow amount through the primary/secondary wastewater treatment units 12, and is not further treated. Instead of going through tertiary treatment in the interchangeable system 14a, the flow from secondary treatment is diverted to discharge, at 24. The excess flow portion 26 of the influent 10 is diverted around the primary/secondary treatment 12 and flows directly to the interchangeable treatment unit 14a. Following the treatment in system 14a, this effluent is discharged at 28. A disinfectant may be applied if required.

In this way, the interchangeable system 14a is switched from tertiary treatment in normal conditions to an overflow treatment unit for excess storm flow.

Some plants may push overflow through primary treatment alone (without secondary treatment), and with the system of the invention the primary-treated sludge can then be treated in the interchangeable zone, discontinuing tertiary treatment.

FIG. 2B can also be considered to illustrate use of the interchangeable system 14a to treat all plant influent in normal flow but with some or all of the primary and secondary treatment zones down for repair or maintenance. In that event there will be no flow into the primary/secondary treatment 12, and no discharge at 24. As noted above, this may require some form of polishing of the effluent at 28, before discharge.

In many cases certain treatment factors in the tertiary treatment or in the overflow treatment by the interchangeable unit 14a will be different for the two, but these are easily and quickly switched back and forth. For example, if the tertiary treatment does not have membranes, nor a final disinfection step, the overflow treatment may need to include disinfection. Screening may be required for the overflow, although screening may have occurred at the influent 10, provided screening capability is adequate for treating all the combined flow.

Further, overflow treatment will usually require addition of coagulant (such as alum), which could be a different coagulant and/or flocculant from any used in the tertiary treatment. The overflow, or bypass flow, may need polishing in the interchangeable zone, such as carbon or zeolite. Another change could be if the tertiary treatment includes denitrification filters, during overflow treatment the addition of organic carbon and the biological treatment of nitrate removal might be ceased.

However, in many cases important treatment features will be present for the one role of the unit 14a, that will also apply to the other. For example, membrane treatment in a tertiary treatment system will be applicable to overflow treatment. Also, if phosphorus removal is part of tertiary treatment, this usually involves a coagulant, which is also needed for overflow treatment. For example, either ferric chloride or alum will be effective for overflow treatment. The invention takes advantage of any redundancy in the existing system, for application to overflow treatment. Depending on the plant's design, existing or new, any redundancy provided for tertiary filtration system can be used for overflow treatment as feasible. In that case the main plant can continue to have both tertiary treatment as well as overflow treatment, utilizing the redundancy.

Even for a newly constructed plant (or an existing plant) which is required to treat overflow, but which does not necessarily require tertiary treatment, the invention enables the overflow unit to be switched to tertiary treatment for normal flow conditions, thereby producing a better effluent. Polishing will likely not be needed.

As noted above, the system of the invention can also be used for a situation in which the main primary/secondary wastewater treatment systems of the plant, or a component of those systems, must be shut down for repair or maintenance. This can be considered as essentially represented in FIG. 2B, in that the excess flow line 26 would be switched to receive all of the influent entering via the influent line 10, with none going to the primary/secondary treatment 12 during the down time. All plant wastewater will then go through the interchangeable system 14a, for minimum treatment as described above. Another possibility is that if only secondary treatment is down for repair, effluent from primary treatment can go to the interchangeable zone until the secondary treatment is back on line.

Another important aspect of the invention is illustrated schematically in FIG. 2C. In that diagram the influent at 10 is processed through the primary/secondary wastewater treatment processes 12 and then, under normal operation, moves to the interchangeable system 14a, as indicated by the dashed line 30, for tertiary treatment. However, in the case of a pure stormwater overflow event, involving stormwaters that would not ordinarily be treated at the wastewater treatment plant 12, assuming sewerage piping is available, the stormwater overflow will be directed to the interchangeable zone 14a. This is indicated by the influent line 32 in FIG. 2C. The stormwaters may have particulates and organic or inorganic contaminants as well as pathogens that may require treatment to meet regulations (current or future regulations). During such a stormwater overflow event, the effluent of the primary/secondary treatment 12 is then diverted to the line 24, for discharge or reuse, bypassing the interchangeable zone 14a.

In another aspect, where a treatment plant is an MBR plant, with primary, secondary and optionally tertiary treatment all combined into one MBR operation, and where the plant has redundancy, i.e. extra trains normally not used (except when needed during maintenance or repair), the redundancy can be used for overflow treatment. Such overflow can be from any of the sources discussed above. This is a re-purposing of redundant treatment trains, rather than of a tertiary treatment zone as discussed above, but still the redundant trains act as an interchangeable system or zone, as does the tertiary treatment zone in the above described embodiments.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

We claim:

1. A method for operation of a wastewater treatment plant, the plant having a liquid side receiving influent flow, with primary and secondary wastewater treatment of the influent flow, and also including a tertiary zone downstream of the secondary treatment, for a final finishing of effluent from the plant, including the steps of:

under normal conditions, operating the plant to receive all influent within design capacity and treating the influent through the primary and secondary treatment steps and then through the tertiary treatment zone in which contaminants are further removed, and during an excess flow event, from overflow of influent sanitary sewage or combined sanitary and stormwater sewage or from a pure stormwater overflow event occurring remotely from the treatment plant, discontinuing flow from the secondary treatment to the tertiary treatment zone and switching the tertiary treatment zone to an overflow treatment zone to receive the excess flow, by diverting effluent from the secondary treatment to be discharged or reused, and receiving the excess flow in the tertiary treatment zone, which removes contaminants and acts as an overflow treatment zone; and, wherein the primary and secondary wastewater treatment includes multiple reaction zones followed by clarification steps to remove organic and inorganic contaminants from wastewater.

2. The method of claim 1, wherein the stormwater overflow is directed through piping from a stormwater sewer system separate from the plant, via piping from the stormwater system to the tertiary treatment zone.

3. The method of claim 1, wherein the tertiary treatment zone includes filtration selected from the group consisting of filter media, cloth or membranes.

4. The method of claim 1, further including a full bypass diverter for diverting all of influent wastewater upstream of the primary and secondary wastewater treatment, so that all influent wastewater is treated in the interchangeable treatment zone, for situations wherein any components of the primary and secondary wastewater treatment are not in operation and repairs or maintenance are undertaken.

* * * * *